United States Patent
Sigwald

[11] Patent Number: 6,125,571
[45] Date of Patent: Oct. 3, 2000

[54] FISHING ROD HOLDER AND BITE DETECTOR

[76] Inventor: Darren H. Sigwald, 102 Highway 35 North, Rockport, Tex. 78382

[21] Appl. No.: 09/412,655

[22] Filed: Oct. 4, 1999

[51] Int. Cl.⁷ .......................... A01K 97/12; A01K 97/10
[52] U.S. Cl. .................................. 43/17; 43/16; 43/25
[58] Field of Search .................. 43/16, 17, 21.2, 43/25

[56] References Cited

U.S. PATENT DOCUMENTS

| | | |
|---|---|---|
| 1,752,397 | 4/1930 | See . |
| 3,010,239 | 11/1961 | Johnson . |
| 3,453,767 | 7/1969 | Lake . |
| 3,945,143 | 3/1976 | Schmitt . |
| 4,202,126 | 5/1980 | pietrenka ........................ 43/17 |
| 4,235,036 | 11/1980 | Dawson ........................ 43/17 |
| 4,334,377 | 6/1982 | Hartwig . |
| 4,510,709 | 4/1985 | Melcher . |
| 4,677,784 | 7/1987 | Butkus . |
| 5,058,308 | 10/1991 | Girard . |
| 5,495,688 | 3/1996 | Sondej . |
| 5,862,621 | 1/1999 | Karppanen ..................... 43/17 |

*Primary Examiner*—Jack W. Lavinder
*Attorney, Agent, or Firm*—G. Turner Moller

[57] ABSTRACT

A fishing rod holder includes an elongate support that is driven into the sand or earth near a body of water. A short tube receives the butt of a fishing rod so the rod end extends upwardly generally parallel to the elongate support. An alarm is fixed to the upper end of the elongate support and provides a tether releasably connected to the rod with a spring biased clip. When the rod is straight, and no fish is on the line, the tether describes a catenary and is essentially untensioned. When a fish is on the line, the rod bends, straightening out the tether and pulling the clip from the rod. When the rod moves out of the clip, the spring biased ends of the clip close thereby completing an electric circuit energizing the alarm.

15 Claims, 1 Drawing Sheet

FISHING ROD HOLDER AND BITE DETECTOR

This invention relates to a fishing rod holder having a bite detector so a fisherman can leave the rod in the holder and rely on the bite detector to show that a fish is on the line.

BACKGROUND OF THE INVENTION

It often occurs when fishing from the beach, wading in the surf, or from the bank of a river or lake, that a fisherman wants to keep bait in the water but be able to do something else for a while. To this end, fishing rod holders of various type have been proposed and made, the simplest of is a length of PVC tubing which can be pushed into the ground or fastened to the bumper of a truck.

A more sophisticated type of fishing rod holder includes some means for detecting when a fish has taken the bait. It is to this class of fishing rod holders that this invention most nearly relates. Typical devices are shown in U.S. Pat. Nos. 3,010,239; 3,453,767; 3,945,143; 4,334,377; 4,510,709; 4,677,784; 5,058,308 and 5,495,688. Another disclosure of interest is found in U.S. Pat. No. 1,752,397.

SUMMARY OF THE INVENTION

In this invention, a fishing rod holder includes an elongate support having a lower end that may be pushed or driven into the sand or soil adjacent the area to be fished. The rod holder includes a tubular member parallel to the elongate support for receiving the butt of the rod to be held. The elongate support extends substantially above the top of the tubular member and carries an alarm, either visual or audible, for alerting the fisherman that a fish is on the line.

The fishing rod holder includes a bodily flexible tether attached near the upper end of the elongate support having a spring biased clip for releasably gripping the rod. When the rod is straight, i.e. no fish is on the line, the tether is essentially untensioned and describes a catenary between the rod and the support. When a fish takes the bait, the rod bends, straightening out the tether and pulling the clip from the rod. The clip includes an electrical switch, open in the open position of the clip, which closes when the rod is pulled from the clip thereby completing an electric circuit energizing the alarm.

For several reasons, the upper end of the elongate support is preferably substantially above the top of the tubular member which receives the rod butt. It is desirable that the alarm be as high as reasonable, particularly if the alarm is visual, so it may be better seen by the fisherman. In addition, the tether needs to make a reasonable angle with the small end of the fishing rod so that bending of the rod reliably pulls the rod from the clip.

It is accordingly an object of this invention to provide an improved fishing rod holder.

Another object of this invention is to provide a fishing rod holder having an improved bite detector.

A further object of this invention is to provide a fishing rod holder that is inexpensive, reliable and rugged.

Other objects and advantages of this invention will become more fully apparent as this description proceeds, reference being made to the drawing and appended claims.

DETAILED DESCRIPTION

Figures 1, 2:
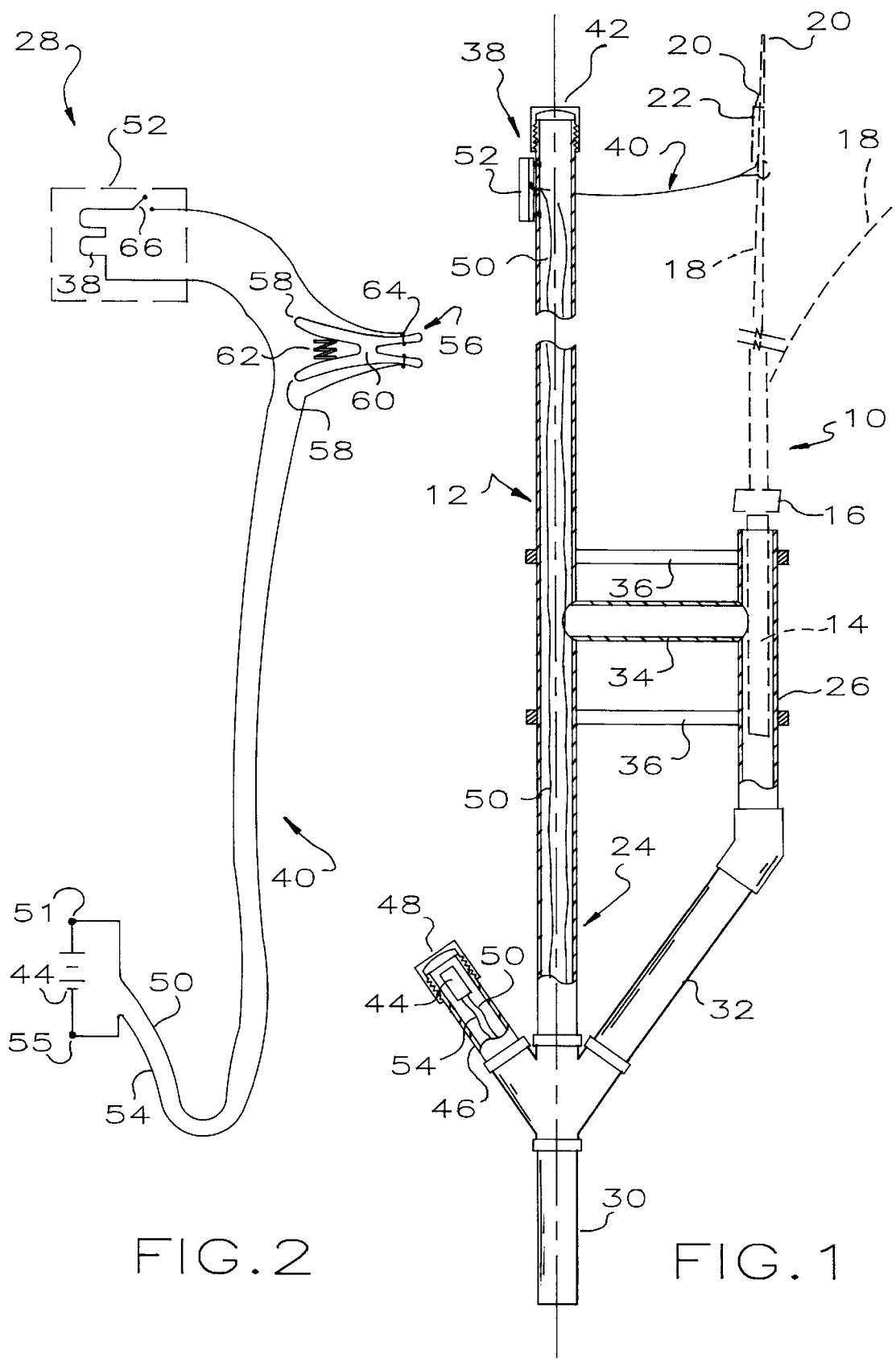
FIG. 1 is a side view of a fishing rod holder of this invention, certain parts being cut away for clarity of illustration.
FIG. 2 is a partly schematic view of the circuitry of the bite detector of this invention.

Referring to FIGS. 1–2, a fishing rod 10 is supported in a fishing rod holder 12 of this invention and comprises a rod butt 14, a reel 16, a flexible tapered shaft or pole 18 having a series of ferrules 20 along the length thereof and a fishing line 22 wound on the reel 16. The fishing rod holder 12 comprises, as major components, a straight elongate support 24, an open topped tubular member 26 for receiving and holding the rod butt 14 and means 28 for detecting a fish on the line 22 of the rod 10.

The rod holder 12 may be made of any suitable material. The embodiment shown in FIG. 1 is made from PVC components. The permanent connections are made by gluing the parts together in a conventional manner. The rod holder 12 includes a lower end 30 adapted to be supported on an underlying surface and is typically pushed or driven into the sand or soil adjacent the area to be fished and accordingly may be beveled for this purpose. The tubular member 26 is generally parallel to the support 24 and connects through an inclined support 32, a rigid brace 34 and one or more straps 36 encircling the support 24 and the tubular member 26.

The elongate support 24 extends substantially above the top of the tubular member 26, at least about two and a half feet and preferably at least about four feet. This has two functions. First, it is desirable for the alarm 38 to be as high as reasonable so it can best be seen or heard by the fisherman. Second, a bodily flexible tether 40 is attached to the support 24 and releasably connects to the fishing rod 10. The tether 40 is made of insulated electrical wire for purposes more fully apparent hereinafter. The tether 40 must make a reasonable angle with the fishing rod 10 so that bending of the shaft 18 reliably energizes the alarm 38. The top of the elongate support 24 is preferably about at least half way up the length of the shaft 18. This allows the tether 40 to be connected to a whippy part of the shaft 18 so there is enough movement of the shaft 18 to pull the tether 40 off the shaft 18 in a reliable and consistent manner. The top of the support 24 is conveniently closed, as by a threaded or otherwise removable end cap 42. It will be seen that the rod holder 12 is a sturdy and convenient support for the fishing rod 10.

The bite detector 28 comprises a circuit including the alarm 38 and one or more batteries 44 which are conveniently housed in an inclined housing 46 extending upwardly from near the lower end 30 of the rod holder 12 and closed in any suitable manner, as by a threaded or otherwise removable end cap 48. A first wire 50 extends from a battery connection 51 in the housing 46 receiving a battery 44 through the elongate support 24 to the alarm 38 which is positioned in a housing 52 affixed near the top of the support 24. The alarm 38 may be a visual alarm, such as a lamp, or an audible alarm, or both. If the alarm 38 is a visual alarm, such as a light bulb, it is preferred that the bulb be aimed directly away from the rod 10 and the tubular member 26 because the rod holder 12 has a tendency to rotate when a fish is on the line. With the bulb aimed directly away from the tubular member 26, is pointed at the shore where the fisherman is. A second wire 54 extends from a battery connection 55 in the housing 46 through the elongate support 24 to the housing 52. The tether 40 is fastened to the housing 52 in any suitable manner and comprises a pair of insulated wires comprising extensions of the wires 50, 54 which connect to a removable clip 56 shown best in FIG. 2.

The removable clip 56 is essentially a clothespin made of an insulating material such as wood or plastic that has been modified to provide a switch for detecting when the fishing rod 10 bends in response to a fish being on the line 22. The clip 56 is illustrated as a plastic member having a pair of pivoted arms 58 connected by a live hinge 60 and biased, in a conventional manner, by a helical spring 62. The insulated wires are attached to the outside of the arms 58 and connect to rivets or fasteners 64 providing facing electrical contacts. When the arms 58 are biased together by the spring 62, the fasteners 64 contact each other, completing a circuit to energize the alarm 38. When the arms 58 are separated, the fasteners 64 are spaced apart thereby providing a break in the circuit deenergizing the alarm 38. The operator of an on-off switch 66 extends through the housing 52 and provides a means for incapacitating the bite detector 28.

Operation of the fishing rod holder 12 and bite detector 28 should now be apparent. When a fisherman wants to put bait in the water and do something else, the fishing rod holder 12 is pushed into the sand or soil adjacent the body of water being fished, leaving the elongate support 24 essentially upright. The bait is cast into the water and the butt 16 of the rod 10 is placed in the tubular member 14. The tether 40 is attached to the rod 10 by pushing the rearward ends of the clip arms 58 together and placing the forward open ends of the arms 58 far up enough on the shaft 18 so the bodily flexible tether 40 is essentially untensioned thereby describing a catenary between the clip 56 and the top of the support 24. Opening the clip 56 causes the fasteners 64 to move out of contact with each other thereby providing an open switch in a straight condition of the shaft 18. The on-off switch 66 is closed so the bite detector 28 is operable.

When a fish takes the bait, the shaft 18 bends toward a dotted line position 68, the tether 40 is tensioned thereby pulling the shaft 18 out of the end of the clip 56. The clip 56 then closes, under the bias of the spring 62, thereby closing a circuit in the bite detector 28 and energizing the alarm 38. The fisherman is thus alerted to a fish being on the line 22.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A holder for a fishing pole of the type having a rod having a butt and a fishing line, comprising
    an elongate support adapted to be disposed in an upstanding position on an underlying surface and having an upright tubular member for receiving the rod butt; and
    means for energizing an alarm in response to bending of the rod, including
        a tether connected to the support and releasably attachable to the rod in an unbent condition thereof, the tether including a clip spring biased toward a closed position and held in an open position by the rod, the clip comprising a circuit open switch in the open position and a circuit closed switch in the closed position,
        an electric circuit including an alarm, battery connections and the clip for energizing the alarm when the rod bends and for maintaining the alarm in an unenergized condition when the rod is straight,
        the clip being arranged to move to the closed position as the rod pulls out of the clip in response to bending of the rod.

2. The holder of claim 1 wherein the clip comprises a pair of arms and a spring normally biasing the arms toward the closed switch and the clip is held in the open position by gripping the fishing rod.

3. The holder of claim 2 wherein the clip comprises a clothes pin.

4. The holder of claim 1 wherein the tubular member is parallel to and spaced from the elongate support and the elongate support comprises a top at least three feet above the tubular member.

5. The holder of claim 4 wherein the alarm is a lamp, the lamp being adjacent an upper end of the elongate support and aimed away from the tubular member so that if the rod holder rotates in response to a fish being on the line, the lamp is aimed away from the fish.

6. The holder of claim 1 wherein the tether describes a catenary between the elongate support and the rod in the unbent condition thereof.

7. The holder of claim 1 wherein the tether comprises a bodily flexible insulated electrical wire making an electrical connection to the clip.

8. A holder for a fishing pole of the type having a rod including a butt and a fishing line, comprising
    an elongate support having one end adapted to be disposed in an upstanding position on an underlying surface and having a tubular member for receiving the rod butt,
    the elongate member extending at least two and a half feet higher than the tubular member,
    means for detecting bending of the rod, including
    a tether connected to the elongate member adjacent an upper end thereof releasably attached to the rod in an unbent condition thereof, the tether including a clip spring biased toward a closed position around the rod and held in an open position by the rod, and
    an alarm mounted on an upper end of the elongate member and connected to the tether for energizing the alarm when the rod bends and for maintaining the alarm in an unenergized condition when the rod is straight.

9. The holder of claim 8 wherein the tubular member is parallel to and offset from the elongate support.

10. The holder of claim 8 wherein the detecting means includes means for energizing the alarm in response to the rod pulling out of the clip.

11. The holder of claim 8 wherein the tether describes a catenary in an unbent condition of the rod.

12. The holder of claim 8 wherein the tether comprises a bodily flexible insulated electrical wire making an electrical connection to the clip.

13. The holder of claim 8 wherein the alarm is a lamp, the lamp being adjacent an upper end of the elongate support and aimed away from the tubular member so that if the rod holder rotates in response to a fish being on the line, the lamp is aimed away from the fish.

14. The holder of claim 8 wherein the alarm is a lamp, the lamp being adjacent an upper end of the elongate support and aimed away from the tubular member so that if the rod holder rotates in response to a fish being on the line, the lamp is aimed away from the fish.

15. The holder of claim 8 wherein the elongate member extends at least four feet higher than the tubular member.

* * * * *